(No Model.)
W. H. BERGER.
HANDLE FOR SAUCEPANS.
No. 402,131. Patented Apr. 30, 1889.
Fig. 1.
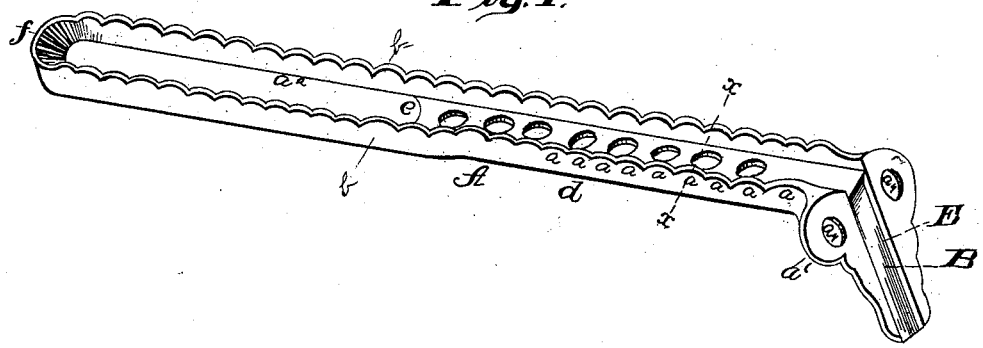
Fig. 2.
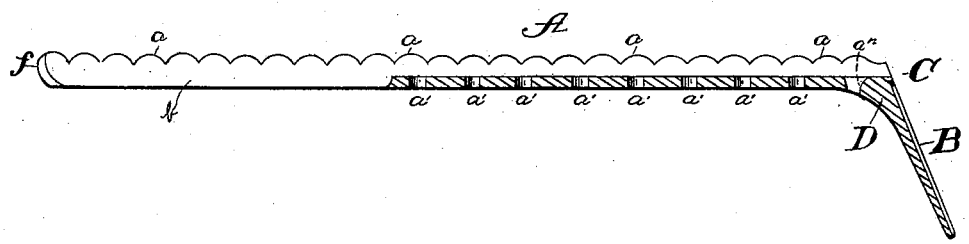
Fig. 3.
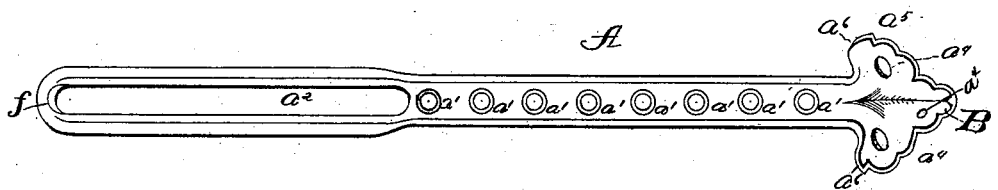
Fig. 5.     Fig. 6.     Fig. 4.
 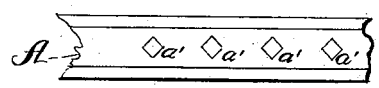 
Witnesses:
J. Harry Stuart
P. J. Gallagher
Inventor:
William H. Berger.
By Chas. E. Barbur
Atty.

UNITED STATES PATENT OFFICE.

WILLIAM H. BERGER, OF PHILADELPHIA, PENNSYLVANIA.

HANDLE FOR SAUCEPANS.

SPECIFICATION forming part of Letters Patent No. 402,131, dated April 30, 1889.

Application filed May 8, 1886. Serial No. 201,584. (No model.)

*To all whom it may concern:*

Be it known that I, WILLIAM H. BERGER, a citizen of the United States, residing at Philadelphia, in the county of Philadelphia and State of Pennsylvania, have invented a new, useful, and original Improvement in Handles for Saucepans and other Articles, of which the following is so full, clear, and exact a description as will enable others skilled in the art to which my invention appertains to make and use the same.

The object of my invention is to construct a simple, inexpensive, and durable handle for saucepans and similar articles, which will possess great strength, and one which will not be liable to turn while held in the grasp of the user; and to these ends my invention consists in certain peculiarities in the construction, arrangement, and combination of parts, substantially as will be hereinafter described, and then pointed out in the claim at the end of the specification.

In the accompanying drawings, Figure 1 is a perspective view of one form of my improved handle. Fig. 2 is a longitudinal sectional view of the same, showing a slight modification in the ear where it is secured to the vessel. Fig. 3 is a bottom plan view of the same, showing a strengthening-boss where the ear is attached to the handle. Fig. 4 is a cross-section of Fig. 1, taken on the line $x$ $x$. Fig. 5 is a modification showing the side flanges curved. Fig. 6 is another modification, showing rectangular perforations through the handle, instead of the circular ones shown in the first three figures.

By reference to Fig. 1 it will be observed that the handle A is provided with two side flanges, $b$, which extend at an angle to the central portion, $e$, and which are provided with serrations or corrugations along the top, (designated by the letter $a$.) At the outer free end of the handle I form an elongated hole, $a^2$, by cutting away the metal sufficiently to make the handle light at this point. The extreme outer free end of the handle ends in a shallow flange, $f$, which is not provided with the corrugations shown on the tops of the flanges $d$. It is quite apparent that this portion $f$ might be corrugated without in any way interfering with the usefulness of my invention; but I find in finishing the article that it is desirable to leave this portion smooth and nearly on the plane with the top of the central portion, $e$. This central portion, $e$, is provided with a series of perforations, $a'$. (Clearly shown in Fig. 2.) These perforations may be circular, oblong, rectangular, or triangular, whichever may be desired, and they will serve to permit all accumulation of water, moisture, and grease to run through off from the top of the handle, which will thus prevent the handle becoming soiled. This I deem of prime importance in this connection, as it is found desirable to construct handles with side flanges which extend at an angle to the main or central portion, $e$, which necessitates a groove or trough in the top of the handle, where there is a tendency of grease and similar refuse matter to accumulate, and which without the perforations it would be quite difficult to remove. The serrations on the tops of the flanges serve to enable the operator to get a firm grip upon the handles, and all liability of slipping is obviated. The straight-sided side flanges, $d$, also form a firm gripping-surface, which prevents the handle turning when grasped. It is quite apparent that if these side flanges are curved the outer sides would offer less resistance, and the pan would be quite likely to turn by the handle slipping. At the inner end of the main portion of the handle I form a boss, D, (clearly shown in Fig. 2,) and just back of this boss is a single perforation, $a^2$, which has inclined sides, through which the water and sediment may be easily brushed to clean the handle.

In the front face of the ear B, I form a slot or rectangular recess, E, which embraces the seam on the vessel and serves as a means of holding the ear in place on the vessel, in addition to the usual rivets and solder which may be used for that purpose. The upper portion of this rectangular recess E is provided in some instances with a projecting lug, C, which is adapted to fit snugly between the upper rim of the vessel and the upper terminals of the two laps which form the seam in the side of the vessel.

It is well understood by those skilled in the art that in the construction of vessels of this character the seam is not continuous to the top of the vessel; but the blank from which the vessel is made has its corners clipped in order to form a thin smooth lap to facilitate the wiring of the top of the vessel. This admirably adapts it to receive the lug C in the upper rectangular recess of the ear. Each side of this lug C is a perforation, $a^4 a^4$, which is adapted to receive the usual rivets used for attaching the handle to the vessel. When it is desired, the ear B may be provided with a third perforation $a^4$ in its lower portion to receive a third rivet for heavier vessels.

In Fig. 5 I show the side flanges curved instead of straight, as in the other figures. In Fig. 6 I show the usual form of construction of a part of the neck of the handle provided with rectangular perforations, which extend through the neck of the handle.

From the foregoing it is quite apparent that the construction shown and described makes a handle which is admirably adapted for use with saucepans, little dippers, and other similar household articles, in which are embodied strength, lightness, and durability, as well as being very pleasing in appearance.

Having described the advantages, uses, and general construction of a preferred means of carrying out my invention, what I desire to secure by Letters Patent, and what I therefore claim, is—

A handle for saucepans and similar articles, consisting of a main portion having side flanges and projecting lug at the inner end of the handle and perforated between said flanges to prevent accumulation of grease, substantially as and for the purposes specified.

In testimony whereof I affix my signature in presence of two witnesses.

WILLIAM H. BERGER.

Witnesses:
   WILLIAM BARTH,
   L. D. BERGER.